United States Patent
Wehler et al.

(10) Patent No.: US 7,634,900 B2
(45) Date of Patent: Dec. 22, 2009

(54) LINK PLATE, CHAIN LINK, ENERGY GUIDING CHAIN, AND INTERMEDIATE PIECE FOR AN ENERGY GUIDING CHAIN, PROVIDED WITH LOCKING MEANS COUPLED BY TORSION FOR CONNECTING A FLIGHT TO A LINK PLATE

(75) Inventors: Herbert Wehler, Neunkirchen (DE); Erwin Eckl, Siegen (DE); Heiner Samen, Marienheide (DE)

(73) Assignee: Kabelschlepp GmbH, Siegen (DE)

( * ) Notice: Subject to any disclaimer, the term of this patent is extended or adjusted under 35 U.S.C. 154(b) by 165 days.

(21) Appl. No.: 10/574,865

(22) PCT Filed: Oct. 1, 2004

(86) PCT No.: PCT/EP2004/010961

§ 371 (c)(1),
(2), (4) Date: Mar. 2, 2007

(87) PCT Pub. No.: WO2005/036025

PCT Pub. Date: Apr. 21, 2005

(65) Prior Publication Data

US 2008/0256922 A1    Oct. 23, 2008

(30) Foreign Application Priority Data

Oct. 8, 2003    (DE) .................... 103 46 653

(51) Int. Cl.
*F16G 13/16*    (2006.01)
(52) U.S. Cl. ........................ 59/78.1; 248/49
(58) Field of Classification Search ............... 59/78.1, 59/900; 248/49, 51
See application file for complete search history.

(56) References Cited

U.S. PATENT DOCUMENTS 4,570,437 A    2/1986 Moritz (Continued)

FOREIGN PATENT DOCUMENTS

DE    82 13 664.5    8/1982

(Continued)

OTHER PUBLICATIONS

English language Abstract, Translated Description and Claims of WO 00/63586, European Patent Office's esp@cenet.com database, 4pp.

(Continued)

*Primary Examiner*—David B Jones
(74) *Attorney, Agent, or Firm*—Smith Law Office (57) ABSTRACT

For the purpose of providing a simplified manner for the production of a joint between a transverse link and a link plate for a chain link of an energy guide chain, it is proposed that the link plate has a fixing means which is suitable for and intended for separable joining of the link plate with a transverse link. The fixing means has at least one locking means. Furthermore, at least one torsional element is provided. This is joined to the fixing means and a wall of the link plate so that it can be pivoted essentially around a longitudinal axis of the link plate. For releasing at least one transverse link, the at least one torsional element is twisted essentially around a longitudinal axis of the link plate. Through this design of a link plate according to the invention, safe and reliable joint between the link plate and a transverse link is made possible.

23 Claims, 5 Drawing Sheets

U.S. PATENT DOCUMENTS

| | | | |
|---|---|---|---|
| 4,807,432 A | | 2/1989 | Mauri |
| 5,157,913 A | | 10/1992 | Wehler et al. |
| 5,174,104 A | * | 12/1992 | Wehler et al. ............... 248/49 |
| 5,220,779 A | * | 6/1993 | Tatsuta et al. ............... 59/78.1 |
| 5,996,330 A | * | 12/1999 | Ehmann et al. ............... 248/49 |
| 6,176,072 B1 | | 1/2001 | Weber |
| 6,349,534 B1 | * | 2/2002 | Zanolla et al. ............... 59/78.1 |
| 6,550,233 B2 | * | 4/2003 | Blase ............... 59/78.1 |
| 7,290,384 B2 | * | 11/2007 | Weber et al. ............... 248/51 |
| 7,310,936 B2 | * | 12/2007 | Saiki et al. ............... 59/78.1 |
| 7,451,590 B2 | * | 11/2008 | Blase ............... 59/900 |
| 2002/0056336 A1 | | 5/2002 | Blase |

FOREIGN PATENT DOCUMENTS

| | | |
|---|---|---|
| DE | 33 18 365 A1 | 11/1984 |
| DE | 41 05 653 A1 | 9/1992 |
| DE | 297 21 588 U1 | 4/1998 |
| DE | 196 47 080 A1 | 5/1998 |
| DE | 198 26 749 A1 | 12/1999 |
| EP | 1 094 585 A1 | 4/2001 |
| WO | WO 98/34040 | 8/1998 |
| WO | WO 98/34050 | 8/1998 |
| WO | WO 00/63586 | 10/2000 |

OTHER PUBLICATIONS

English language Translated Description and Claims of DE 82 13 664.5, European Patent Office's esp@cenet.com database, 3pp.

English language Abstract, Translated Description and Claims of DE 198 26 749 Al, European Patent Office's esp@cenet.com database, 4pp.

* cited by examiner

LINK PLATE, CHAIN LINK, ENERGY GUIDING CHAIN, AND INTERMEDIATE PIECE FOR AN ENERGY GUIDING CHAIN, PROVIDED WITH LOCKING MEANS COUPLED BY TORSION FOR CONNECTING A FLIGHT TO A LINK PLATE

FIELD AND BACKGROUND OF THE INVENTION

The invention refers to a link plate of an energy guide chain, a chain link of an energy guide chain, an energy guide chain, and an intermediate piece for an energy guide chain.

Energy guide chains are frequently used when a moveable component, especially a component which moves essentially on a predetermined track, is to be supplied, for example, with current, water, consumables or similar. In this case, the lines from a fixed point must be led to the component so that the movement of the component on its predetermined track is made possible without any damage to the lines.

The energy guide chain consists of chain links which are linked together in an articulated manner, where the energy guide chain is moved along a predetermined track. Here the lines in the energy guide chain are guided practically in a predetermined manner so that the lines are exposed to only a very slight wear, if any.

A chain link has two link plates which form the side boundaries of the chain link and at least transverse link which forms the upper and/or lower limit of the chain link. The chain links are designed so that a chain link can be joined to at least one neighboring chain link and/or to at least one end piece in order to thus form the energy guide chain. Mostly this linking is done through corresponding joining means, which are formed correspondingly in the neighboring link plates.

The link plate and transverse link can be made of one piece, for example, from a plastic, especially produced by injection molding, but it is also customary to form the transverse links and the link plates so that they can be joined together separably. A separable joint of the link plate with at least one transverse link has the advantage that access to the lines becomes easy so that inserting or taking out lines from the chain as well as possible access to the lines for maintenance purposes is easily possible.

Several possibilities are known in the state of the art for forming a separable joint between transverse link and link plate. For example, from WO 00/63586 A1 a lock-in connection is known to be used between transverse link and link plate which can be separated without the use of tools, manually. In the case of such a joint, unintended separation of the joint may occur easily.

An energy guide chain is known from WO 98/34040 A1 in which the transverse link has end sections for joining the transverse link to the link plate, which makes pivoting of the transverse link around pivoting axes in the two end sections possible.

An energy guide chain is known from U.S. Pat. No. 4,807, 432 in which always one transverse link per chain link is joined separably to the link plates. Here the joining to the two link plates is done with the aid of lock-in catches, each of which is always formed on the transverse links. The disadvantage here is that the widths of the chain links, that is, the length of the transverse links, must be known even already during the manufacture of the transverse links, since the locking catches have to be produced when forming the transverse links.

Based on the above, the task of the invention is to provide a link plate, a chain link, an energy guide chain and a fixing means for an energy guide chain which makes it possible to produce a separable joint between the transverse link and link plate in a simple manner which, in spite of this, is so solid that unintended opening of the joint is excluded.

For a simplified manner for producing a joint between a transverse link and a link plate for a chain link of an energy guide chain, it is proposed that the link plate have a fixing means which is suitable and intended for separable joining of the link plate to a transverse link. The fixing means has at least one locking means. Furthermore, at least one torsional element is provided. This is joined to the fixing means and a wall of the link plate so that it can be pivoted out essentially around a longitudinal axis of the link plate. At least for the release of a transverse link, the at least one torsional element is twisted essentially around a longitudinal axis of the link plate. Through this design of a link plate according to the invention, a safe and reliable joint between the link plate and the transverse link is made possible.

In a preferred embodiment of the link plate, the fixing element does not protrude beyond the edge of the link plate, so that unintended separation of a transverse link joined to the link plate is avoided. The safety can be increased further by making the top side of the transverse link essentially flush with the fixing element or having it lie above the fixing element. In such a design of the link plate, the fixing means preferably has an area for insertion of a tool, into which a tool, for example a screwdriver, can be inserted. Using the tool, through the fixing means a torsional moment is introduced into the torsional element. If the torsional moment is high enough, the fixing element will be pivoted so that the transverse link is released. Resetting of the fixing means into its rest position occurs automatically through the torsional element when the transverse link would be disassembled.

The useful cross-section of an energy guide chain is also determined by the distance of the link plates to one another. In order to design the useful cross-section of an energy guide chain as effectively as possible, according to an advantageous embodiment of the link plate it is proposed that the fixing means be arranged in a receptacle which extends at least from an inner wall in the direction of an outer wall of the link plate and that the fixing means be dimensioned so that the fixing means is integrated essentially completely in the receptacle. This is not absolutely necessary. It is also possible that at least one locking means is designed protruding from the inner wall. This is not critical when the locking means protrudes into the transverse link.

The receptacle in the wall of the link plate can be designed in the form of an opening. In the case of this design, the fixing means and the link plate are made from several pieces. The fixing means is preferably joined to the link plate non-separably. It has the corresponding fixing means which make it possible to attach the fixing means to the link plate in the receptacle. Here, for example, it can be barbed gaps, which cooperate with the correspondingly formed means on the fixing means. Specifically, it is proposed that torsional elements be provided on both sides of the fixing means which are designed correspondingly so that these torsional elements penetrate partially into the gap formed in the wall of the link plate. Having the link plate made of several pieces has the advantage that optionally different fixing means can be used depending on the purpose of application. Thus, for example, a type of a fixing means can be used for different link plates when these link plates have essentially identically formed receptacles. The joining of the fixing means to the receptacle can be done by positive and/or non-positive locking.

In order to avoid increased assembly expenditure, which occurs in handling link plates made of several pieces, according to a further advantageous embodiment of the link plate according to the invention, it is proposed that the fixing means and the link plate be made of one piece. Such a one-piece design is especially advantageous when the link plate is made from a plastic.

The wall and/or the at least one fixing means are preferably made of at least one plastic, at least one elastomeric plastic, a renewable raw material and/or metal. Thus, for example, it is possible to produce the wall and the fixing means from one or several plastics, while the at least one torsional element is made of a metal. Such a design is advantageous, especially when, in the case of relatively thin walls of the link plate, there is a danger that the torsional element might break.

Through WO 98/34050, a link plate is known which can be joined to a transverse link so that the transverse link is pivotable around a longitudinal axis of the link plate. This has the advantage that in the case of a chain link the transverse link can be separated from the link plate while maintaining the joint with the other link plate. As a result of this, it is ensured that the transverse link will not be lost. In order to avoid loss of a transverse link, according to a further advantageous embodiment of the link plate according to the invention, it is proposed that at least one pivoting axis receptacle be formed to hold a pivoting axis of a transverse link and/or of an intermediate piece. The pivoting axis receptacle and the fixing means represent functional units which are independent of one another, so that in the case of the link plate according to the invention, it is possible to join the link plate to transverse links, which are either pivotable or non-pivotable.

Transverse locking means are provided in order to prevent that the transverse link undergo a relative movement in the direction essentially transverse to the longitudinal axis of the link plate, in the case of joining the link plate with a transverse link With this measure, it is achieved, in the case of an energy guide chain which is built from chain links which have at least one link plate according to the invention, that during the operation of the energy guide chain this transverse link will not become separated from the link plate according to the invention.

SUMMARY OF THE INVENTION

In order to further increase the safety, it is proposed that the link plate according to the invention have longitudinal locking means, which, when joining the link plate to a transverse link, essentially prevent a relative movement of the transverse link in a direction essentially parallel to the longitudinal axis of the link plate.

Above it was shown that the torsional element is subjected to a torsional moment in order to make it possible to separate a transverse link from the link plate according to the invention. In order to prevent the applied torsional moment from exceeding a maximum permissible torsional moment, it is proposed that means be provided for limiting the excursion of the fixing means.

According to an advantageous embodiment of the chain link, it is proposed that a transverse link cooperate with at least one fixing means. Here it is advantageous when at least one locking means cooperates with a locking receptacle of the transverse link. Preferably here the chain link is designed so that the locking means and locking receptacle can be joined together by positive and/or non-positive locking. The locking receptacle is preferably formed in a front face of the transverse link. The locking receptacle can also have a profile which corresponds to that of the transverse link. Then the transverse link can be designed as a profile section. Here it is preferable to have the transverse link made of metal or plastic. The transverse link can be from an extruded semi-finished product with corresponding profile design.

In order to prevent the occurrence of unintended separation of a transverse link from the link plate or upon action of forces during the operation of an energy guide chain with a chain link according to the invention, it is proposed that a minimum force be necessary for separating the transverse link and the fixing means, especially of the locking means and the locking receptacle. This minimum force can assume different values depending on the design of the chain link and on the purpose of application of the chain link. Here it is preferable to design the chain link so that the minimum force is not too high, and manual opening of the transverse link by an operator is still possible.

According to yet another advantageous embodiment of the chain link according to the invention, it is proposed that longitudinal and/or transverse locking receptacles be formed on the transverse link which can be engaged with the longitudinal and/or transverse locking means with positive or non-positive locking.

In order to realize a pivotable joint of a transverse link to a link plate, it is proposed that at least one pivoting means be formed on a joining side between the transverse link and the link plate, on the transverse link, and that this can be engaged in the pivoting axis receptacle.

Alternatively or additionally, the chain link can also be designed in such a way that at least one intermediate piece is provided which takes up on one side the joining side of the transverse link and the other side of which has at least one pivoting means which can be engaged in the pivoting axis receptacle of the link plate.

The chain link can also be the end link for an energy guide chain. Such an end link has two link plates but here they each can have only one linking region. In addition, the chain link may have a device with the aid of which the end link can be joined to a fixing means at the fixed location of the movable connection.

Such an energy guide chain is characterized by the fact that it can be manufactured easily and simply. Moreover, unintended separation of the transverse links from the link plates can be avoided safely and reliably.

According to yet another inventive idea, a fixing means is proposed which is suitable and which is intended for separable linking of the link plates to a transverse link, where the fixing means has at least one locking element joined to at least one torsional element. The at least one torsional element can be joined to a wall of the link plate so that the fixing means can be pivoted essentially around a longitudinal axis of the link plate.

A design of the fixing means in which the torsional element is designed as at least one torque rod is preferred. The term rod includes different cross-sectional shapes of the torsional element. The torsional element can have a rectangular cross-section. Essentially circular cross-sections of the torsional element are also possible. The torsional element can be an integral component of the fixing means. The fixing means can also be made of several parts, where the locking element forms one part and the at least one torsional element another part and the locking means is joined to the torsional element preferably so they cannot be separated.

According to a preferred embodiment of the fixing means, it is proposed that the locking means be arranged between two torsional elements.

Other details and advantages of the invention will be explained with the aid of the practical examples shown in the drawing, without the object of the invention being limited to these specific practical examples. The following are shown.

DETAILED DESCRIPTION OF THE PREFERRED EMBODIMENTS

Figure 1:
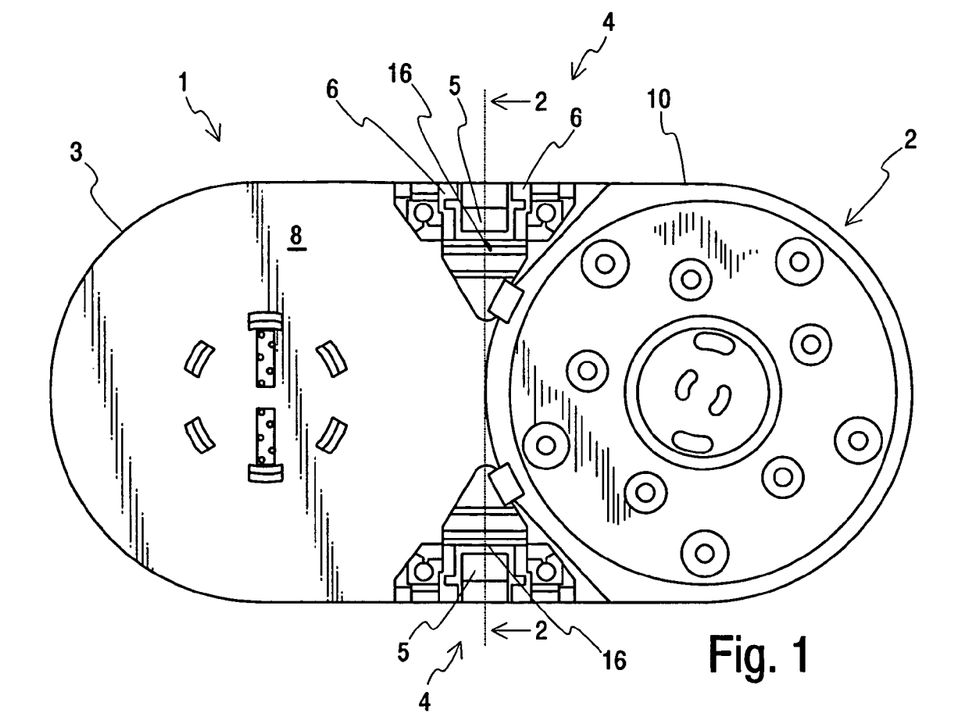
FIG. 1 is a link plate in a front view.
Figure 2:
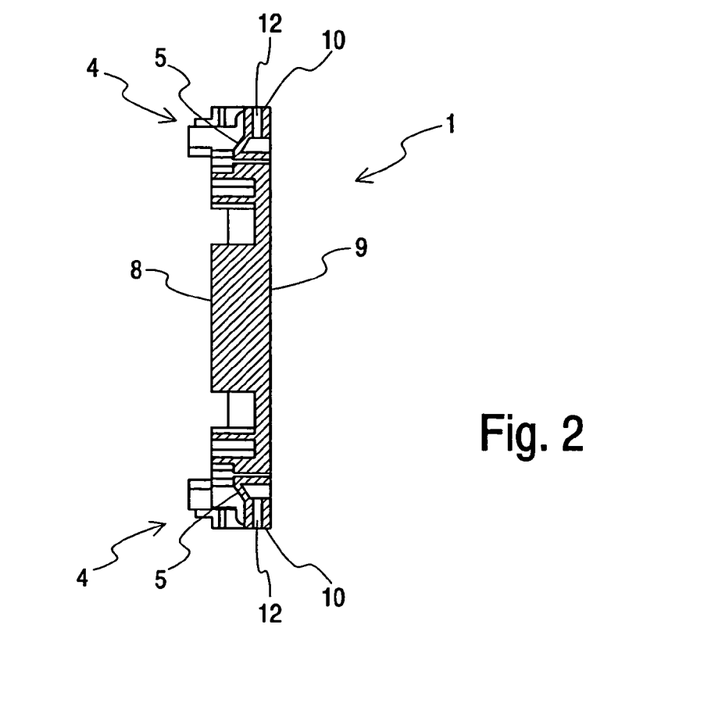
FIG. 2 is a sectional representation along line 2-2 of FIG. 1.

FIG. 1 shows a practical example of a link plate 1 for a chain link of an energy guide chain. The link plate 1 has opposite-lying formed link regions 2, 3. The link regions 2, 3 are preferably formed so that they are complementary to one another, so that link plates can be joined to one another in an articulated manner. There are numerous possibilities for the design of link regions 2, 3 to which the person skilled in the art can refer.

Link plate 1 has a fixing means 4 for the purpose of separable joining of the link plate to a transverse link. The design of the fixing means can be seen specifically in FIGS. 3 and 4.

Figure 3:
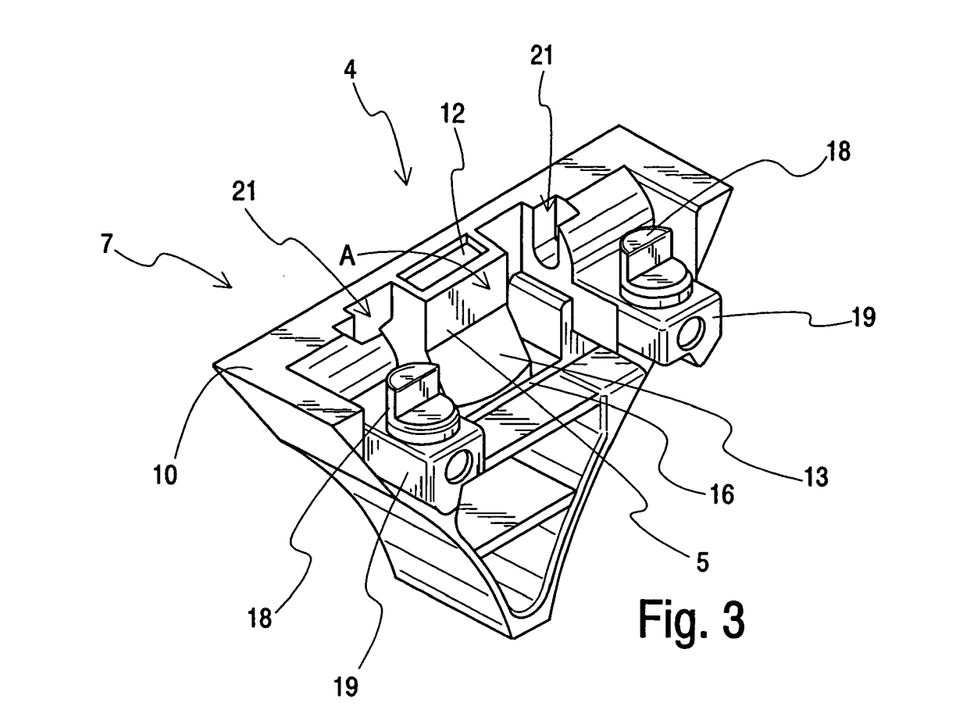
FIG. 3 is a perspective view from the front of an area of a link plate with a fixing means.
Figure 4:
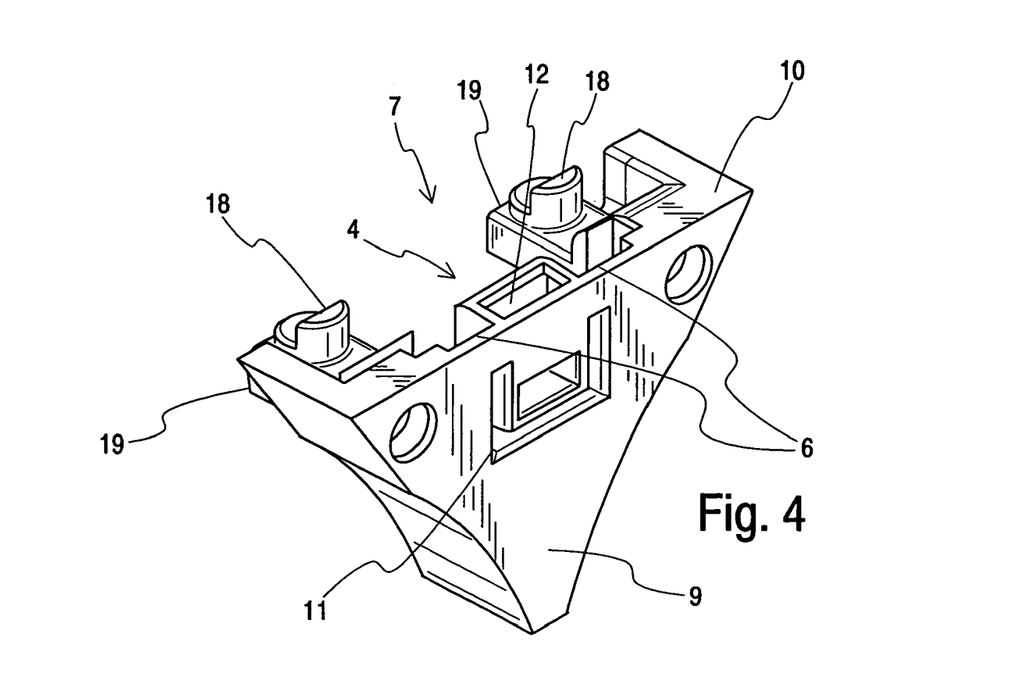
FIG. 4 is the section of FIG. 3 in a perspective view from the back.

The fixing means 4 has a locking means 5. Furthermore, fixing means 4 has two torsional elements 6, which are joined to the link plate. In the practical example shown, the torsional elements 6 have an essentially rectangular cross-section. They are joined on the one hand to fixing means 4 and on the other hand to an edge region of a receptacle 7. The receptacle 7 which holds the fixing means 4 extends from an inner wall 8 in the direction of an outer wall 9 of the link plate. Receptacle 7 furthermore extends from an edge 10 in the direction of the opposite edge of the plate.

In the practical example shown, the fixing means 4 is made in one piece with the link plate 1. The fixing means is joined to the edge region of receptacle 4 through torsional elements 6. FIG. 4 shows that the fixing means 4 is separated from the link plate through an essentially U-shaped free space 11. A tool access region 12 is provided in the upper part of fixing means 4. The tool access region has an essentially rectangular cross-section in the practical example shown here so that, for example, a screwdriver can be introduced into the tool access region. By pivoting the tool which is now shown here, the fixing means 4 is pivoted essentially around a longitudinal axis of link plate 1. The pivoting motion of the fixing means is shown in FIG. 3 by arrow A when a transverse link, which is not shown, is to be separated.

Figure 5:
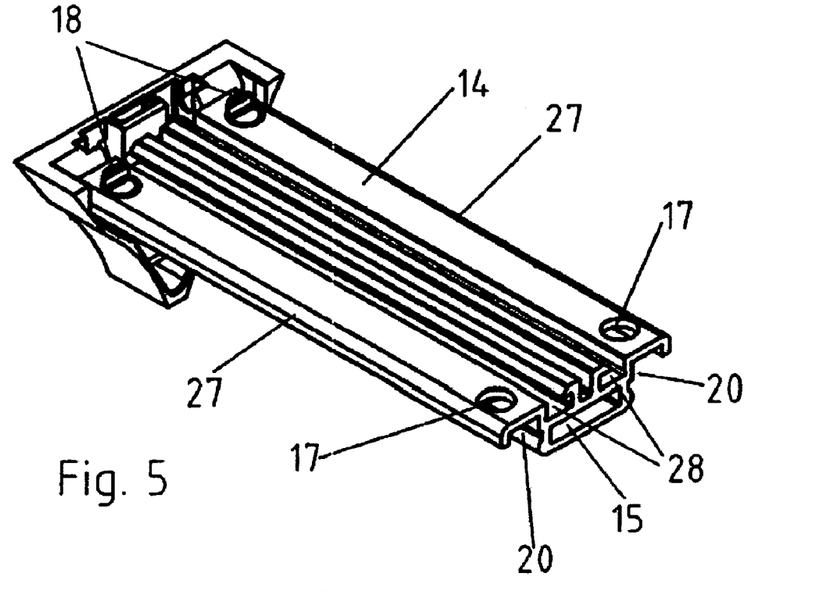
FIG. 5 is a section of a link plate joined to a transverse link.

The locking means 5 has a feed slope 13 which extends in the direction of inner wall 8. A free space is provided below locking means 5 into which an end region of a transverse link engages. During the formation of a joint between link plate 1 and a transverse link, for example, a force is applied onto the transverse link transversely to the longitudinal direction of the plate. The edge of the transverse link slides on the feed slope 13, as a result of which fixing means 4 will be pivoted. The locking means 5 pivots back when this engages in a cavity formed on a front face of the transverse link. FIG. 5 shows a joint of a link plate 1 with a transverse link 14. The transverse link 14 is designed as a longitudinal profile piece. It has a cavity 15 which extends in the longitudinal direction of the transverse link. This is not absolutely necessary. It is sufficient when the cavity 15 is dimensioned so that the locking element 5 can engage in it.

In order to limit the pivotal motion of the fixing means, especially when the transverse link is dismounted from the link plate, a stop 16 (FIG. 1) is provided underneath the fixing means.

In the practical example shown, the torsional elements 6 have an essentially rectangular cross-section. This is not absolutely necessary. It is possible for the torsional elements to have other as well as different cross-sections and shapes. It is also possible to join the fixing element to the link plate through several torsional elements 6.

The transverse link 15 shown in FIG. 5 has openings 17 in its end regions. In the mounted state, pegs 18 engage through openings 17. The pegs 18 are arranged on protrusions 19. The protrusions 19 are essentially perpendicular to inner wall 8. Protrusions 19 are profiled. They engage in the corresponding regions 20 of transverse link 14. An embodiment is preferred in which regions 20 form a joint with protrusions 19 in a positive or non-positive locking manner.

Pegs 18 and protrusions 19 form transverse or longitudinal locking means with the correspondingly formed transverse links. Through the transverse locking means, when joining the link plate to a transverse link, essentially a relative motion of the transverse link in the direction essentially transversely to the longitudinal axis of the link plate is prevented. The longitudinal locking means are designed so that when joining the link plate to a transverse link, essentially a relative motion of the transverse link in a direction essentially parallel to the longitudinal axis of the link plate is prevented.

Figure 6:
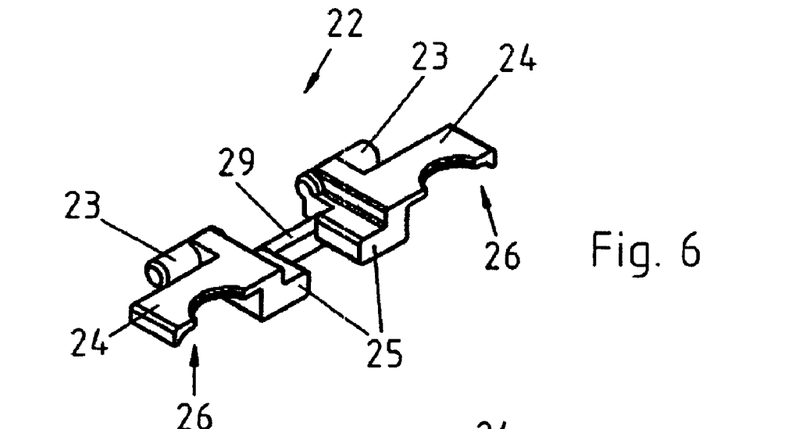
FIG. 6 is a perspective view of an intermediate piece from above.
Figure 7:
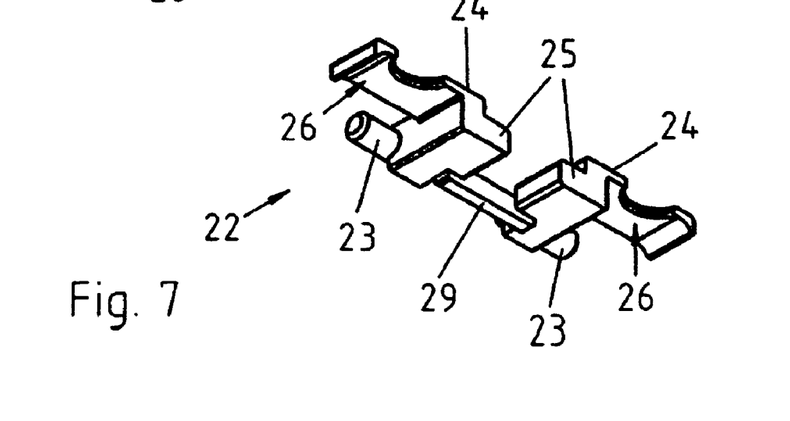
FIG. 7 shows the intermediate piece according to FIG. 6 in a perspective view from underneath.

Furthermore, the link plate has a pivoting axis receptacle 21 which is suitable and is intended for accepting a pivoting axis of a transverse link and/or of an intermediate piece 22. The design of an intermediate piece is shown in FIGS. 6 and 7. The intermediate piece 22 has two pivot shafts 23. The pivot shafts 23 are placed at a distance from one another. They are suitable to be introduced into the corresponding pivot shaft receptacles of the pivotal axis receptacle 21 whereby the joint between the link plate and the intermediate piece is designed so that the intermediate piece 22 cannot be separated from the link or can only be separated upon application of an increased force. The distance between the pivot shafts 23 is to be dimensioned so that the possibility of movement of the fixing means 4 is not hindered. The pivot shafts 23 are joined to connecting elements 24. The connecting element 24 has a protrusion 25 which engages into a correspondingly designed receptacle 28 in transverse link 14. In addition, each connecting element 24 has a wrap-around 26 which encompasses the longitudinal edge region 27 of transverse link 14. The connecting elements 24 are joined together through a fixed link 29.

Figure 8:
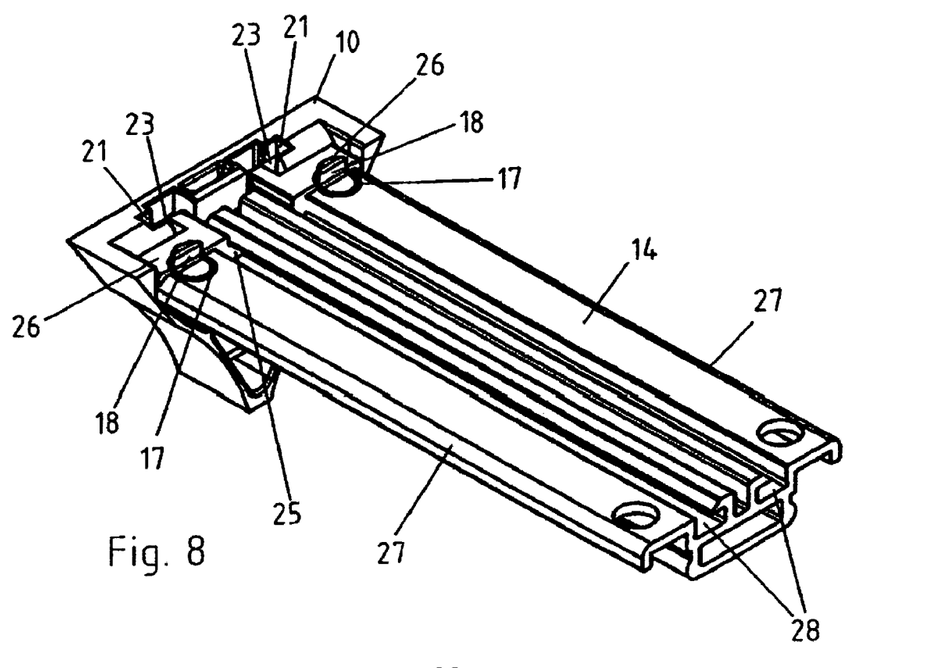
FIG. 8 is a section of a link plate with a transverse link joined with an intermediate piece.
Figure 9:
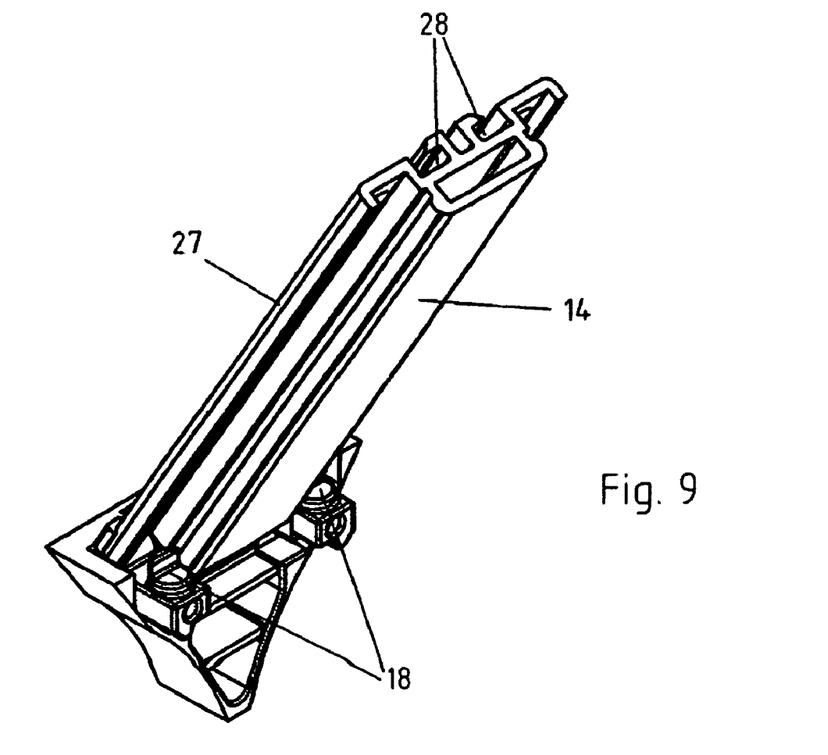
FIG. 9 is a perspective view of the transverse link according to FIG. 8 in the pivoted position.
Figures 10, 11:
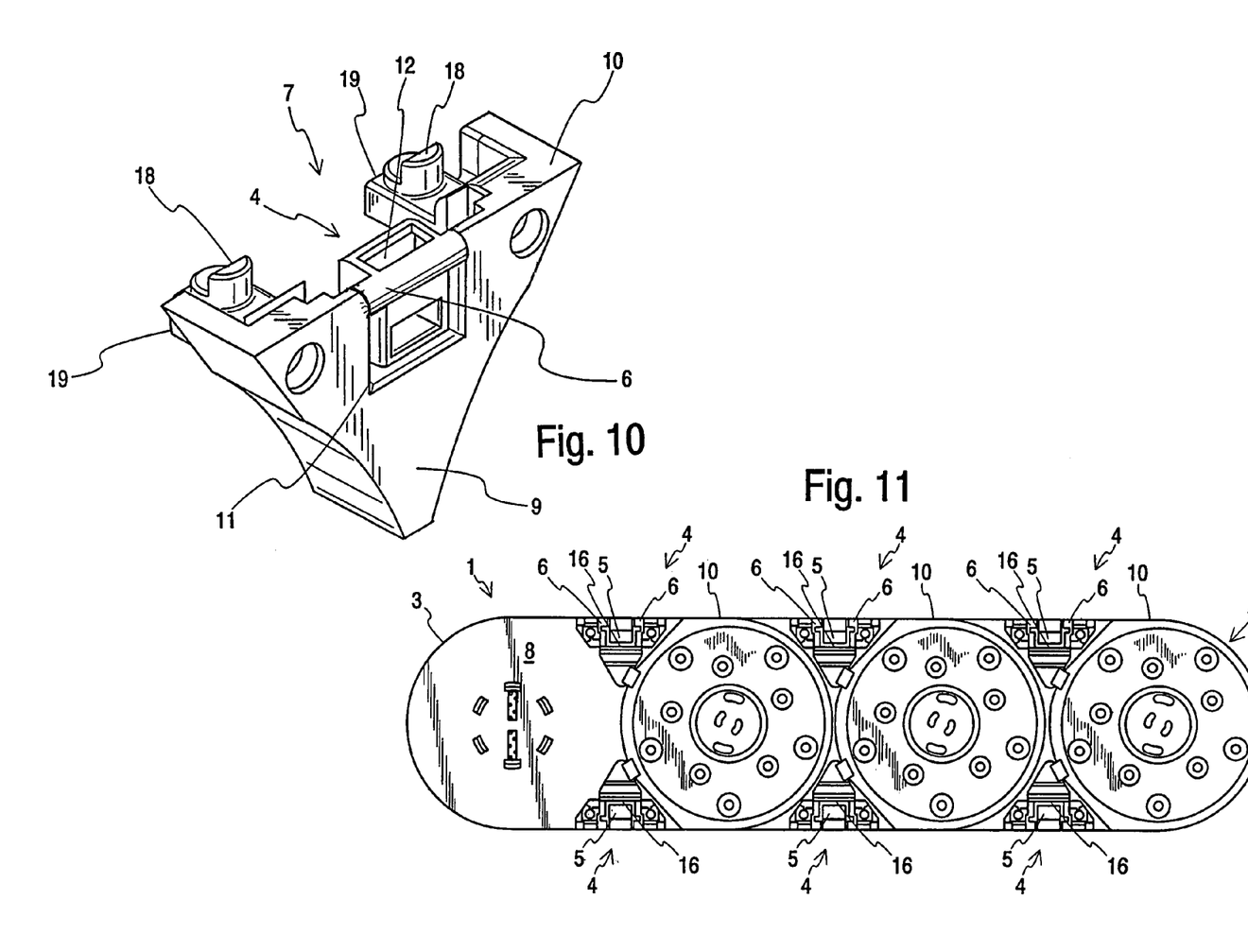
FIG. 10 is a perspective view from the front area of a link plate fixing means.
FIG. 11 is a three-link segment of an energy guide chain in accordance with the present invention.

FIGS. 8 and 9 show the intermediate piece 22 joined to a transverse link 14, which is joined to a link plate.

The protrusions 25 of intermediate piece 22 engage in the recesses 28 of transverse link 14. The wrap-arounds 26 encompass the longitudinal edge regions 27 of transverse link plate 14. The pivot shafts 23 are arranged in the corresponding recesses of pivoting axis receptacle 21. Furthermore, it can be seen from the representation in FIG. 8 that the pegs 18 extend through openings 17. The pegs 18 are designed so that when the transverse link 14 is pivoted, they do not hinder this pivoting process. FIG. 9 shows the transverse link in a pivoted position.

The invention claimed is:

1. A chain link for an energy guide chain comprising:
   a link plate;
   a transverse link;
   a fixing device releasably joining the link plate to the transverse link, wherein the fixing device defines an open upper entrance portion for receiving an end portion of the transverse link and includes a lock; and a torsional element joined to the fixing device and a wall of the link plate in such a way that the fixing device is pivotable around the torsional element and a longitudinal axis of the link plate.

2. The chain link according to claim 1, wherein the fixing device is arranged in a pivoting axis receptacle formed in the wall, extending at least from an inner wall in a direction of an outer wall of the link plate.

3. The chain link according to claim 1, wherein the fixing device and the link plate are formed in one piece.

4. The chain link according to claim 1, wherein the fixing device and the link plate are made of several pieces.

5. The chain link according to claim 4, wherein the fixing device is releasably joined to the receptacle.

6. The chain link according to claim 2, and further comprising:
a pivoting axis joined to the transverse link, and wherein the pivoting axis receptacle is formed for accepting a pivoting axis of a transverse link.

7. The chain link according to claim 1, wherein the lock substantially prevents a relative movement of the link plate in a direction substantially transverse to the longitudinal axis of the link plate when joining the link plate with a transverse link.

8. The chain link according to claim 1, wherein the lock is adapted to substantially prevent relative movement of the transverse link in a direction substantially parallel to the longitudinal axis of the link plate when joining the link plate to a transverse link.

9. The chain link according to claim 1, and further comprising:
means for substantially limiting the fixing device from pivoting.

10. The chain link according to claim 1, wherein the fixing device has at least one tool access region.

11. The chain link of claim 1 and further comprising:
a plurality of additional chain links having link plates connected to one another by at least one transverse link; and
at least one of the additional link plates is connected to the chain link.

12. The chain link according to claim 11, wherein each transverse link of the additional links cooperates with at least one fixing device.

13. The chain link according to claim 11, and further comprising:
a locking piece receptacle defined in the transverse link, and wherein a lock cooperates with a locking piece receptacle of the transverse link of the additional links.

14. The chain link according to claim 13, wherein the lock and locking receptacle are joined to one another in a positive locking manner.

15. The chain link according to claim 12, wherein the transverse link and the fixing device, are releasably engaged.

16. The chain link according to claim 13, wherein the locking receptacle is formed on the transverse link and can be engaged with the lock in a positive locking manner.

17. The chain link according to claim 11, wherein each additional link plate comprises:
a joining side; and
a pivot formed on the transverse link, which can be engaged with a pivoting axis receptacle.

18. The chain link of claim 1, wherein:
the fixing device produces a separable joint.

19. A chain link for an energy guide chain comprising:
a link plate;
a fixing means releasably joining the link plate to a transverse link, where the fixing means has a locking means; and
a torsional element joined to the fixing means and a wall of the link plate in such a way that the fixing means is pivotable around a longitudinal axis of the link plate, and wherein the torsional element comprises a torque rod.

20. The chain link according to claim 1, wherein the wall is made of a material selected from the group consisting of:
plastic, elastomeric plastic, renewable raw material; and metal.

21. An energy guide chain comprising:
a plurality of chain links each having:
a link plate;
a fixing means releasably joining the link plate to a transverse link, where the fixing means has a locking means;
a torsional element joined to the fixing means and a wall of the link plate in such a way that the fixing means is pivotable around a longitudinal axis of the link plate, and wherein the torsional element comprises a torque rod
a plurality of additional chain links having link plates connected to one another by at least one transverse link; and
at least one of the additional link plates is connected to the chain link; and
wherein each additional chain link includes an intermediate piece having a side which accepts the joining side of a transverse link, and the other side of which has at least one pivoting means engaged with the pivoting axis receptacle of the plate link.

22. A chain link for an energy guide chain comprising:
a link plate;
a fixing means releasably joining the link plate to a transverse link, where the fixing means has a locking means; and
a torsional element joined to the fixing means and a wall of the link plate in such a way that the fixing means is pivotable around a longitudinal axis of the link plate wherein the torsional element comprises: a torque rod; and
wherein the fixing means produces a separable joint between a link plate and a transverse link in the link plate, where the fixing means can be joined to a locking means joined to a torsional element, where the torsional element can be joined with a wall of the link plate so that it can be pivoted around a substantially longitudinal axis of the link plate.

23. A chain link for an energy guide chain comprising:
a link plate;
a transverse link;
a fixing means releasably joining the link plate to the transverse link, wherein the fixing means includes a locking means;
two torsional elements joined to the fixing means and a wall of the link plate in such a way that the fixing means is pivotable around a longitudinal axis of the link plate; and
wherein the fixing device produces a separable joint and the locking means is arranged between the two torsional elements.

* * * * *

UNITED STATES PATENT AND TRADEMARK OFFICE
CERTIFICATE OF CORRECTION

PATENT NO. : 7,634,900 B2
APPLICATION NO. : 10/574865
DATED : December 22, 2009
INVENTOR(S) : Herbert Wehler et al.

It is certified that error appears in the above-identified patent and that said Letters Patent is hereby corrected as shown below:

Title Page and Col. 1
Title (54) should read: "An energy guide chain link with torsion-coupled lock component"

Signed and Sealed this

Sixteenth Day of March, 2010

David J. Kappos
*Director of the United States Patent and Trademark Office*